US 7,707,227 B2

(12) United States Patent
Shibata (10) Patent No.: US 7,707,227 B2
(45) Date of Patent: Apr. 27, 2010

(54) MINUTES-CREATING SUPPORT APPARATUS AND METHOD

(75) Inventor: Hirohito Shibata, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 358 days.

(21) Appl. No.: 11/214,812

(22) Filed: Aug. 31, 2005

(65) Prior Publication Data

US 2006/0218477 A1 Sep. 28, 2006

(30) Foreign Application Priority Data

Mar. 25, 2005 (JP) ............................. 2005-090123

(51) Int. Cl.
*G06F 7/00* (2006.01)
*G06F 17/30* (2006.01)

(52) U.S. Cl. .................. 707/802; 707/922; 704/235; 709/204; 715/753

(58) Field of Classification Search .............. 707/104.1, 707/999.107; 709/204; 715/500, 753; 704/235
See application file for complete search history.

(56) References Cited

U.S. PATENT DOCUMENTS

| | | | | | |
|---|---|---|---|---|---|
| 5,278,979 | A | * | 1/1994 | Foster et al. ................. | 707/203 |
| 5,572,728 | A | * | 11/1996 | Tada et al. ................... | 707/200 |
| 5,819,300 | A | * | 10/1998 | Kohno et al. ................ | 715/246 |
| 6,100,882 | A | * | 8/2000 | Sharman et al. ............. | 704/235 |
| 6,339,431 | B1 | * | 1/2002 | Ohmori et al. ............... | 345/619 |
| 6,349,303 | B1 | * | 2/2002 | Saito .......................... | 707/101 |
| 6,417,844 | B1 | * | 7/2002 | Kodama ...................... | 345/173 |
| 6,470,356 | B1 | * | 10/2002 | Suzuki ...................... | 707/104.1 |
| 6,473,778 | B1 | * | 10/2002 | Gibbon ....................... | 715/201 |
| 6,665,835 | B1 | * | 12/2003 | Gutfreund et al. ........... | 715/202 |
| 7,380,212 | B2 | * | 5/2008 | Cody et al. .................. | 715/752 |
| 7,506,246 | B2 | * | 3/2009 | Hollander et al. ........... | 715/230 |
| 7,548,951 | B2 | * | 6/2009 | Nagayama et al. .......... | 709/204 |
| 2002/0069218 | A1 | * | 6/2002 | Sull et al. ................. | 707/501.1 |
| 2002/0091658 | A1 | * | 7/2002 | Bae ............................ | 706/62 |
| 2002/0120681 | A1 | * | 8/2002 | Cho et al. .................... | 709/203 |
| 2005/0093971 | A1 | * | 5/2005 | Ono et al. ................. | 348/14.09 |
| 2005/0208962 | A1 | * | 9/2005 | Kim ........................ | 455/550.1 |
| 2005/0228861 | A1 | * | 10/2005 | Nagayama et al. .......... | 709/204 |
| 2006/0109102 | A1 | * | 5/2006 | Gortz et al. ................. | 340/531 |
| 2006/0294453 | A1 | * | 12/2006 | Hirata ...................... | 715/500.1 |
| 2007/0260968 | A1 | * | 11/2007 | Howard et al. ........... | 715/500.1 |

FOREIGN PATENT DOCUMENTS

| | | |
|---|---|---|
| JP | 5-266084 A | 10/1993 |
| JP | 2003-153224 A | 5/2003 |

OTHER PUBLICATIONS

Duygulu et al., "Associating video frames with text", Aug. 2003,Carnegie Mellon University, 7 pages.*
Hamada et al.,"Associating Cooking Video with Related Textbook", 2000, ACM Multimedia Workshop Marina Del Rey CA USA, pp. 237-241.*

* cited by examiner

*Primary Examiner*—John E Breene
*Assistant Examiner*—Phong Nguyen
(74) *Attorney, Agent, or Firm*—Sughrue Mion, PLLC (57) ABSTRACT

There is provided a minutes-creating support apparatus including a conference image retaining portion retaining a conference image captured by a capturing apparatus to be associated with date and time information, a memo editing portion associating information input from an inputting apparatus with the date and time information, and a minute creating portion editing the information input from the inputting apparatus with retaining the date and time information.

25 Claims, 7 Drawing Sheets

| BLOCK | TIME | TEXT |
|-------|------|------|
| A     |      |      |
| A     |      |      |
| B     |      |      |
|       |      |      |
|       |      |      |

| GROUP | TIME | BLOCK IDENTIFIER | TEXT |
|---|---|---|---|
| A | xxx | a | |
| A | xxx | b | |
| A | xxx | c | |
| A | xxx | d | |
| B | xxx | e | |
| B | xxx | f | |
| B | xxx | g | |
| | | | |

MINUTES-CREATING SUPPORT APPARATUS AND METHOD

BACKGROUND OF THE INVENTION

1. Field of the Invention

This invention relates to an apparatus, method, and program for supporting creating the minutes.

2. Description of the Related Art

Generally, the content of the discussion on the conference or meeting is regarded as variable asset of an organization, and the minutes are often required to create and submit after the conference. Every conference has a writer who takes notes on the content of the conference in handwriting. This is a burden of the minutes writer. Therefore, the techniques have been proposed for supporting creating the minutes as follows.

Japanese Patent Application Publication No. 5-266084 (hereinafter, referred to as Document 1) describes the apparatus for supporting creating the minutes by giving the system voice keywords such as "title", "participant", "problem", and the like while the conference is being held, and converting the keywords into character data.

Japanese Patent Application Publication No. 2003-153224 describes the apparatus for supporting the progress of the online meeting system, by clearly expressing opinions such as "agree", "disagree", "neutral" before making remarks, and using as the minutes.

It is to be noted that there is a problem in that the minutes cannot be written according to the interests, if the minutes are written by inputting fragmentary characters of the voice keywords with the use of the apparatus as described in Document 1. Moreover, there is another problem in that the apparatus as described in Document 2 imposes a burden on the participants of the online meeting in inputting texts as represented by chatting.

SUMMARY OF THE INVENTION

The present invention has been made in view of the above circumstances and provides an apparatus, method, and program for supporting creating the minutes that are capable of creating the minutes to include intentions of the minutes writer, without imposing a burden on the minutes writer.

According to one aspect of the present invention, there may be provided a minutes-creating support apparatus including a conference image retaining portion retaining a conference image captured by a capturing apparatus to be associated with date and time information, a memo editing portion associating information input from an inputting apparatus with the date and time information, and a minute creating portion editing the information input from the inputting apparatus with retaining the date and time information. The minutes can be created while retaining the linkage between the content of the conference progress and the conference image, and the description in the minutes and the conference image can be linked. This makes it possible to confirm which description is associated with what scene on the conference after the conference. A burden is not imposed on the conference participants.

According to another aspect of the present invention, there may be provided a minutes-creating support method including retaining portion retaining a conference image captured by a capturing apparatus to be associated with date and time information, associating information input from an inputting apparatus with the date and time information, and editing the information input from the inputting apparatus with retaining the date and time information.

According to a further aspect of the present invention, a storage medium readable by a computer, the storage medium storing a program of instructions executable by the computer to perform a function for supporting creating the minutes, the function including retaining portion retaining a conference image captured by a capturing apparatus to be associated with date and time information, associating information input from an inputting apparatus with the date and time information, and editing the information input from the inputting apparatus with retaining the date and time information.

BRIEF DESCRIPTION OF THE DRAWINGS

Embodiments of the present invention will be described in detail based on the following figures, wherein.

DESCRIPTION OF THE EMBODIMENTS

A description will now be given, with reference to the accompanying drawings, of embodiments of the present invention.

Figure 1:
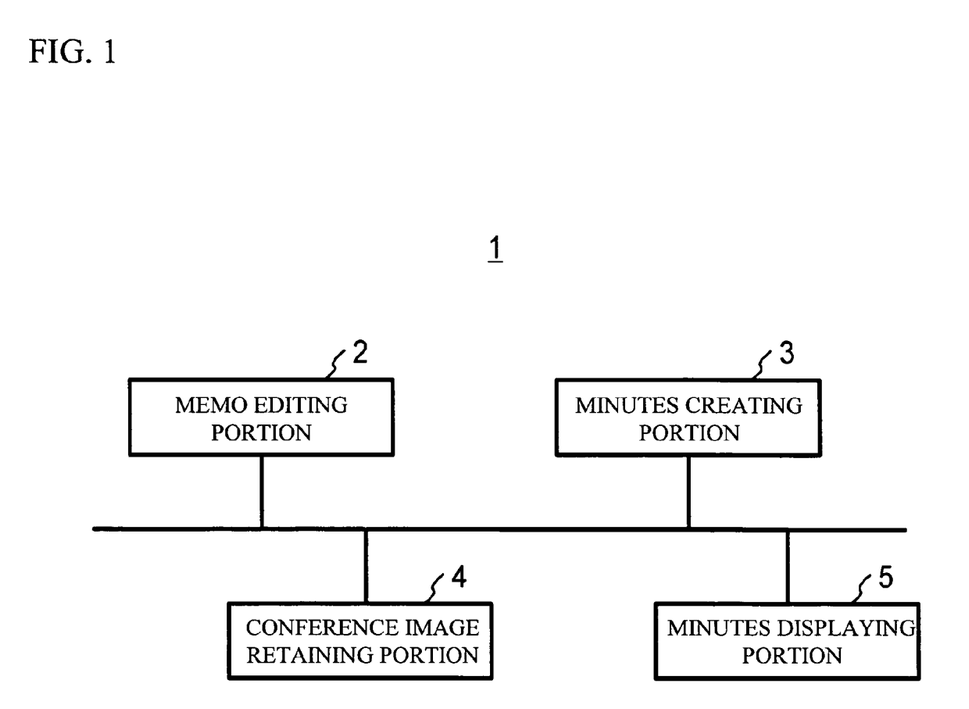
FIG. 1 is a block diagram of a minutes-creating support apparatus 1 embodying the present invention.

FIG. 1 is a block diagram of a minutes-creating support apparatus 1 embodying the present invention. As shown in FIG. 1, the minutes-creating support apparatus 1 includes a memo editing portion 2, a minutes creating portion 3, a conference image retaining portion 4, and minutes displaying portion 5. The minutes-creating support apparatus 1 is composed, for example, of a CPU (Central Processing Unit), RAM (Random Access Memory), ROM (Read Only Memory), hard disc device, display, mouse, keyboard, camcorder, or the like. The conference image retaining portion 4 retains a conference image captured by the camcorder (capturing apparatus) to associate the conference image with date and time information. In other words, the conference image retaining portion 4 stores the conference image in which conference scenes have been captured by the camcorder.

Figure 2:
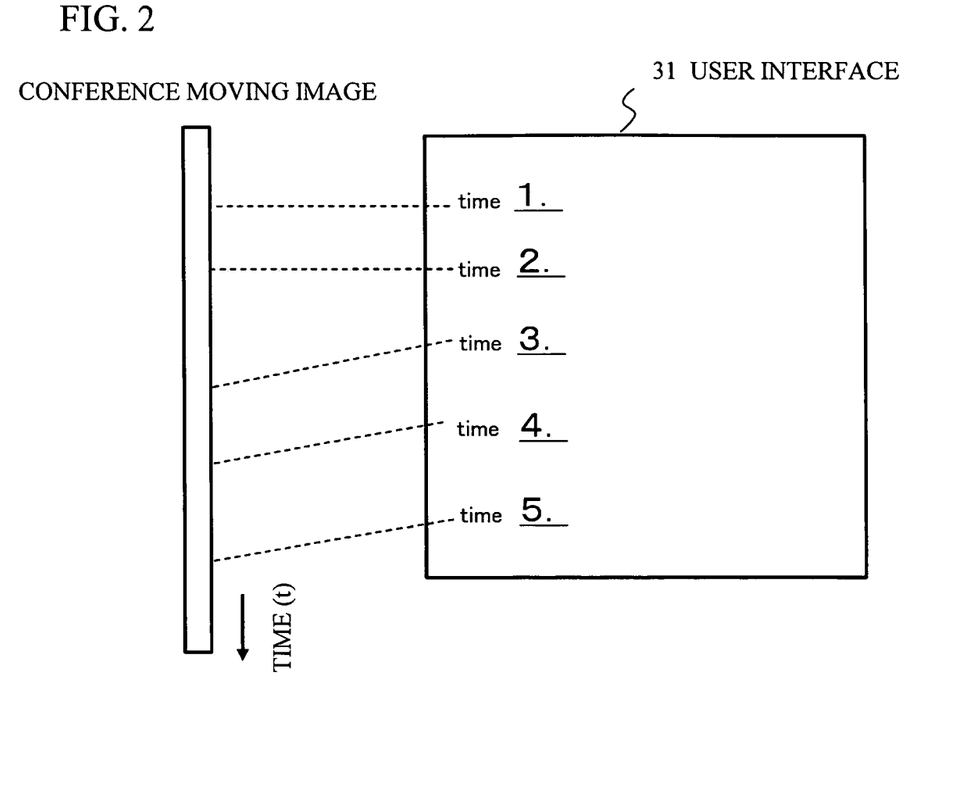
FIG. 2 is a user interface provided by a memo editing portion.

The memo editing portion 2 is used for associating the information that has been input on the keyboard (inputting apparatus) with the date and time information. That is to say, the memo editing portion 2 receives a content of conference progress that has been input by the minutes writer, and in addition stores the content of conference progress after associating with the conference image. Here, the content of conference progress denotes a memo that has been input by the minutes writer. The memo editing portion 2 associates the content of conference progress with the conference image according to the date and time information of the conference image. The memo editing portion 2 provides a screen (user interface) on which the content of conference progress can be input. Accordingly, the memo editing portion 2 serves as an editor so that the minutes writer may record remarks or decisions on the conference. In addition, the memo editing portion 2 associates a given piece of information that has been input from the inputting apparatus with the date and time information. Here, the given piece of information may be a character, word, phrase, sentence, line, and combinations thereof. The given piece of information may be called as block. The information that has been input from the inputting apparatus is, for example, the information in text format. Referring to FIG. 2, the memo editing portion 2 displays the information that has been input from the input apparatus to correspond to the date and time information.

FIG. 2 shows a user interface 31 provided by the memo editing portion 2. The minutes writer is able to write down the content of conference progress such as the minutes writer's impression, the summary of the whole conference, or the like with the user interface 31 provided by the memo editing portion 2. The user interface 31 is different from the normal editor in that each block is stored to be associated with the date and time when the block was written.

Figure 3:
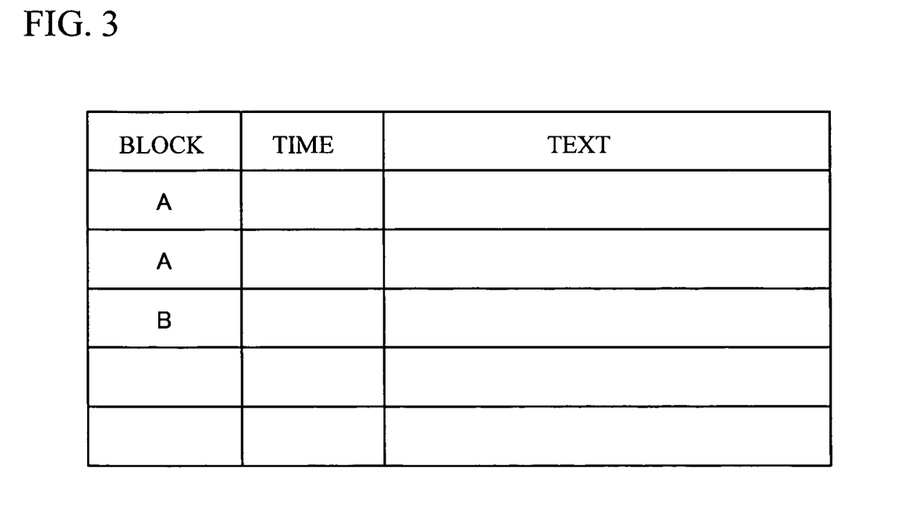
FIG. 3 shows a table in which the content of the conference progress is stored to be associated with the date and time.

FIG. 3 shows a table in which the content of the conference progress is stored to be associated with the date and time. The memo editing portion 2 retains this table. As shown in FIG. 3, the texts that have been input by the minutes writer are also associated with the conference image according to the time (date and time) on a block basis in the table retained by the memo editing portion 2. The date and time are provided for associating the memo on the conference with the conference image. Here, the block denotes a semantic unit of the written content. How to write or describe the semantic unit varies depending on a memo writer or conference type, yet the date and time may be given to the unit separated with a line or an empty line. In addition, giving the date and time to the semantic unit intends to save the memory (reduce the data amount). If the memory saving is not intended, the date and time that has been input may be given to every word or every character. Here, the memo edited on the memo editing portion 2 is supposed to be edited by the minutes writer along with the progress of the conference, yet a technique of voice automatic recognition may be employed.

The minutes creating portion 3 provides a screen on which the information that has been input from the inputting apparatus can be edited with retaining the date and time information. The minutes creating portion 3 is capable of creating the minutes with retaining the association of the content of conference progress with the conference image, on the basis of the text written by obtaining the content of conference progress that has been input from the memo editing portion 2 and by obtaining the voice on the conference. Even if the text is moved by cut and paste or drag and drop, the date and time of the block in which the texts are included are also moved. Further, even if the text is modified, the original date and time included in the block are kept without change. The minutes that have been completed in the above-mentioned manner can be traced which memo is a fundamental from among those written on the conference, by referring to the date and time given to the content. A replay portion that replays the conference image is further provided on the basis of the information that has been input from the inputting apparatus, although the replay portion is omitted in FIG. 1.

Figure 4:
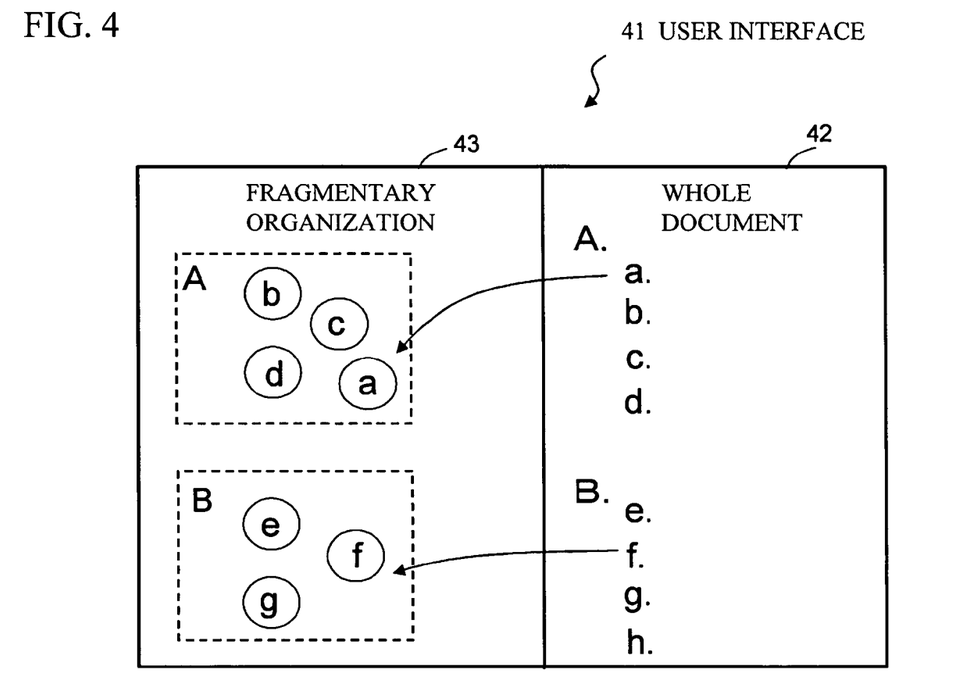
FIG. 4 is an example of an advanced user interface provided by a minutes creating portion.

FIG. 4 is an example of an advanced user interface provided by the minutes creating portion 3, and the advanced user interface has capabilities similar to those of an outline processor. As shown in FIG. 4, the minutes creating portion 3 provides a screen, on which the information that has been input from the inputting apparatus is moved on a block basis. The block of the texts that has been created by the memo editing portion 2 is developed and organized in an area of a fragmentary organization 43. The block retains the date and time that have been given while being edited on the conference. The block still retains the date and time even after having moved in the area 43. If the block is divided into multiple blocks, the original date and time are given to all the divided blocks. The blocks can be grouped into, for example, A or B. In a document whole area 42, the blocks are sequentially aligned same as the organization in the area 43, and the document is composed. Specifically, the groups A and B correspond to headers of the document, and the blocks are sequentially aligned from the top such as sections. As shown in FIG. 4, blocks a, b, c, and d that belong to the group A in the area 42 are aligned below a header A in the area 42. Blocks e, f, and g that belong to the group B in the area 42 are aligned below a header B in the area 42.

Figure 5:
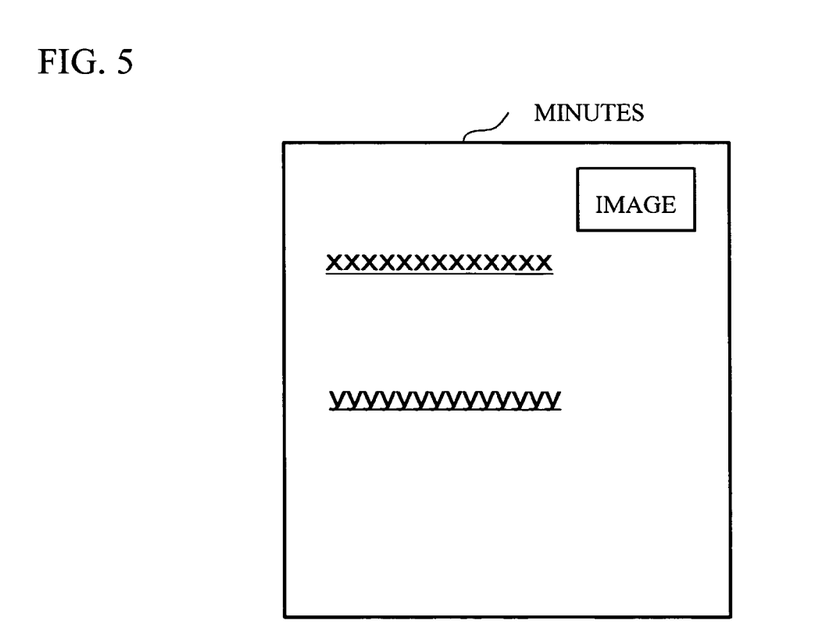
FIG. 5 shows a display example of a minutes displaying portion.

The minutes displaying portion 5 displays the minutes that have been created by the minutes creating portion 3. The minutes displaying portion 5 displays a portion that has been created on the basis of the content of conference progress in the minutes so that the portion can be identified. The minutes displaying portion 5 displays the portion in which the content of the conference progress has been edited with colors. Even if the memo that has been written on the conference is modified, the date and time are still given to the modified memo included in the minutes that have been created in the minutes creating portion 3 as far as the whole block in the memo is not deleted.

FIG. 5 shows a display example of the minutes displaying portion 5. The minutes displaying portion 5 displays the portion that has been created on the basis of the content of conference progress so that the portion can be identified by colors. This means that the technical content in the minutes is an objective description on the conference, and also means that there is a moving image corresponding to the description. On the other hand, it is highly possible that the portion that is not colored is the summary of the whole conference or impressions based on the subjectivity of the minutes writer, and is not the developed content of the description on the conference. The minutes displaying portion 5 replays the conference image corresponding to the selected portion in the minutes. For example, a minutes reader clicks the colored portion, and then the conference image is replayed, corresponding to the date and time stored in the conference image retaining portion 4.

Figure 6:
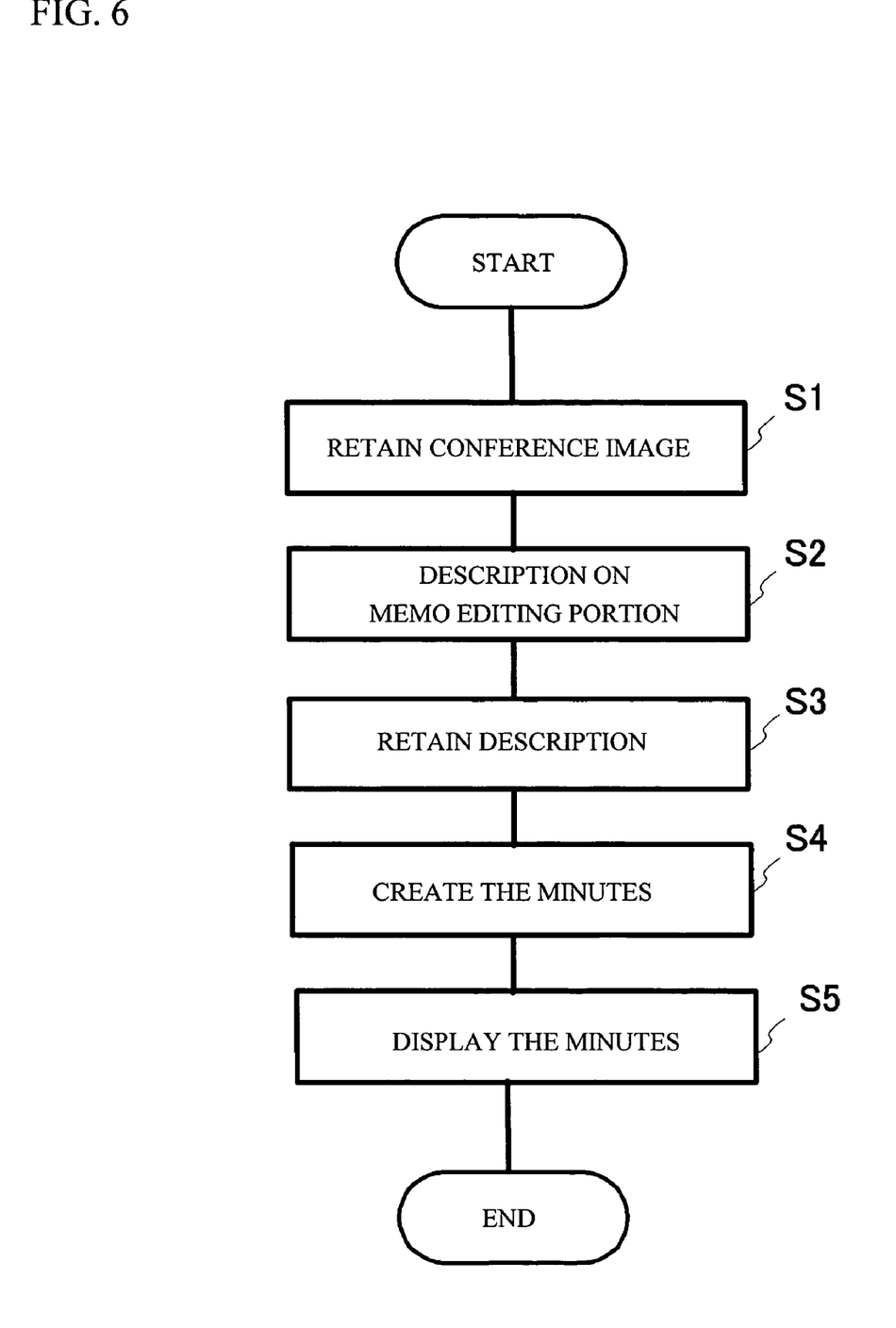
FIG. 6 is a flowchart of the minutes-creating support apparatus.

Next, a description will be given of a process flow of the minutes-creating support apparatus 1. FIG. 6 is a flowchart of the minutes-creating support apparatus 1. First, the conference is captured by a camcorder in step S1, and the conference image is stored in the conference image retaining portion 4 together with the date and time information. The minutes writer makes fragmentary descriptions of the content of conference progress during the conference with the memo editing portion 2 in step S2. The aforementioned description may be made of simple keywords instead of accurate descriptions of the remarks. The memo editing portion 2 stores the description together with the date and time information in step S3. After the conference, the minutes writer draws up the minutes with the minutes creating portion 3 according to the memos that have been written on the conference in step S4. Here, if the content of the description is moved, the date and time information is also moved together. Therefore, the respective descriptions include the date and time information in the finally accomplished minutes.

After the minutes are delivered, the minutes reader takes a look at the minutes displayed on the minutes displaying portion 5 in step S5. Here, the colored portion is the text that has been written on the conference and has been edited and included in the minutes. Clicking the colored portion allows the minutes reader to view the corresponding conference image. It is therefore possible to reuse the memos written on the conference and create the minutes readily. The minutes reader is able to access the corresponding image readily with the content of the minutes. That is to say, the minutes reader is able to read the minutes and view only the image in which the reader gets interested, and is also able to confirm the minutes at once if the reader likes to know more.

Figure 7:
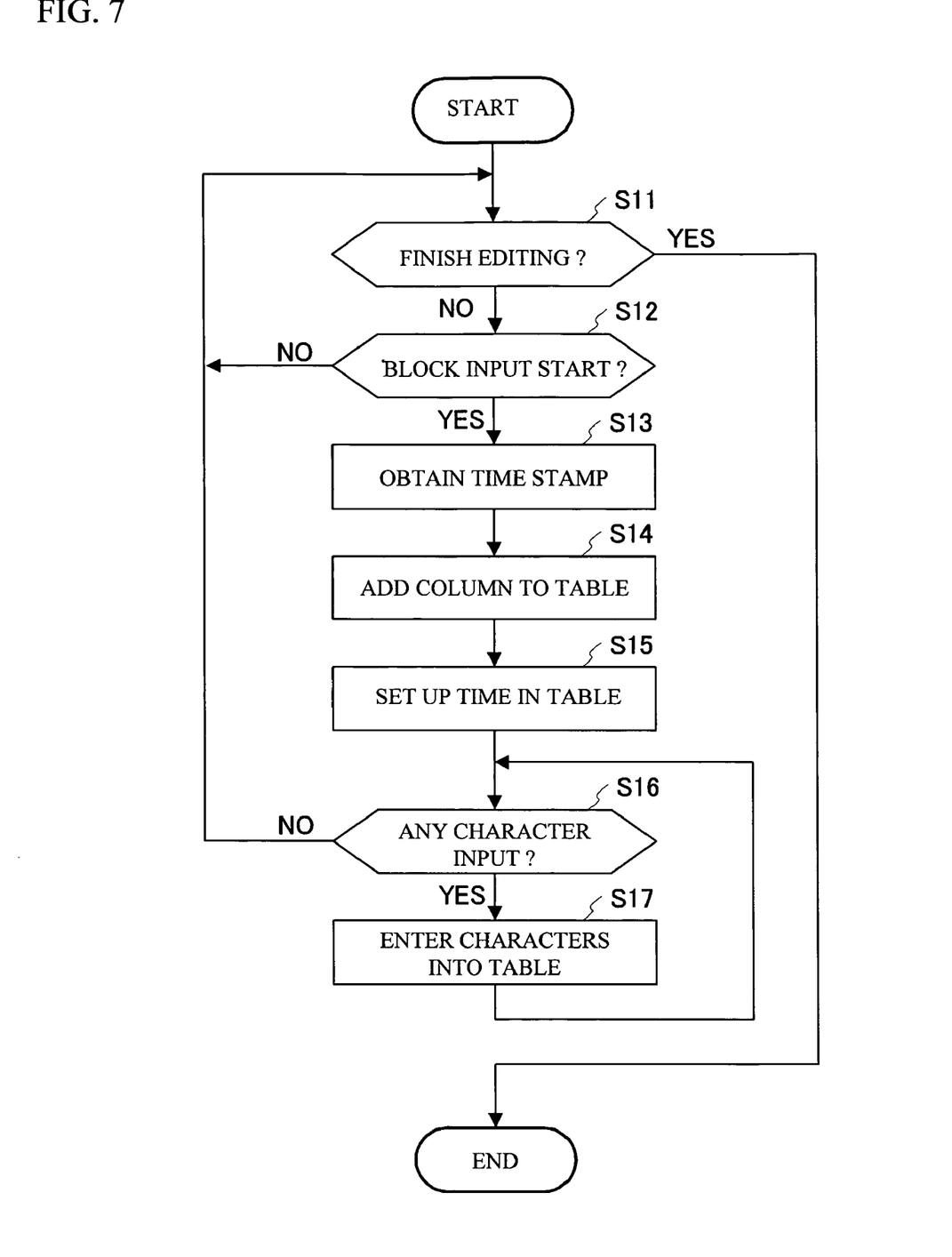
FIG. 7 is a flowchart of a memo editing process.

FIG. 7 is a flowchart of a memo editing process. The memo editing portion 2 checks whether or not the memo has been edited in step S11. If the memo has not been edited, go to step S12. The memo editing portion 2 checks whether a block input starts in step S12. If the memo has been edited, go to step S13 to acquire a time stamp. The memo editing portion 2 adds a column to the table shown in FIG. 3 in step S14. The memo editing portion 2 sets up a time in the column in the table shown in FIG. 3 in step S15. The memo editing portion 2 checks whether there is a character input in step S16. If the memo editing portion 2 determines that there is no character input, go back to step S11. If the memo editing portion 2 determines that there is a character input, the memo editing portion 2 goes to step S17, enters the character into the text field in the table shown in FIG. 3, and completes the memo editing process.

Figure 8:
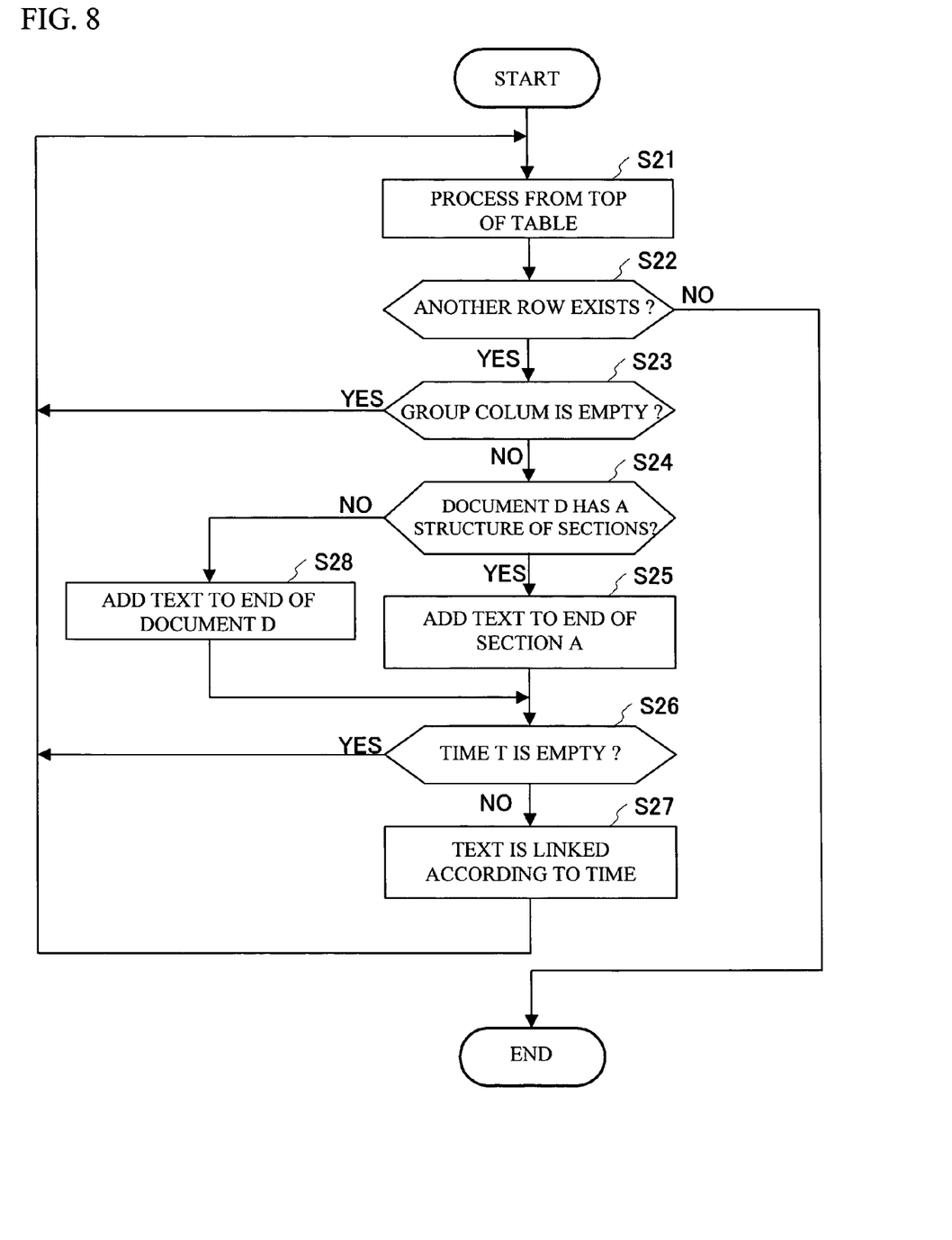
FIG. 8 is a flowchart describing the process of composing the document with the table.
Figure 9:
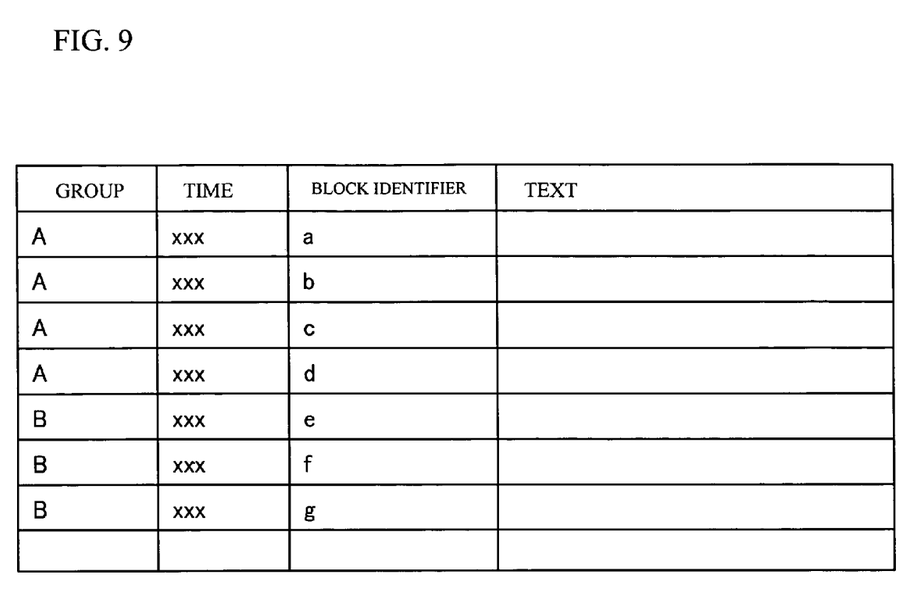
FIG. 9 shows a data structure of a document created with an advanced user interface of the minutes creating portion.

FIG. 9 shows a data structure of the document created with the advanced user interface of the minutes creating portion 3. Each row in the table denotes each block. The row includes a group to which the block belongs, a time given to the block, a block identifier, and a content of text. FIG. 8 is a flowchart describing the process of composing the document with the table shown in FIG. 9. The document to be composed according to the flowchart shown in FIG. 8 is shown in the area 42 of the whole document shown in FIG. 4. The process is sequentially conducted from the top of the table in step S21. The minutes creating portion 3 checks whether the table has a next row in step S22. If the table has the next row, the minutes creating portion 3 goes to step S23. If the group column is empty in step S23, the minutes creating portion 3 goes back to step S21. If the group column is not empty in step S23, the minutes creating portion 3 goes to step S24. The minutes creating portion 3 checks whether a document D has a structure including the sections in step S24. If the document D has the structure including the sections, the text in the block is added to an end of the header A in step S25. If the document D does not have the structure including the sections, the text in the block is added to an end of the document D in step S28. If the minutes creating portion 3 determines that a time T is empty, go back to step S21. If the minutes creating portion 3 determines that the time T is not empty, the text is linked based on the time in step S27.

The minutes can be created in consideration of the content of conference progress that has been input by the minutes writer, in accordance with the present invention. It is therefore possible to automatically create the minutes including the intentions or impressions of the minutes writer. In addition, if the description in the minutes is sometimes different from the memory of the minutes reader, the minutes reader likes to know which is correct. The description of the minutes is not linked with the conference image according to the conventional techniques, and accordingly, it is impossible to know which scene the description has written about. In contrast, the minutes are created with retaining the association of the content of conference progress with the conference image in accordance with the present invention. It is therefore possible to make a linkage between the content of conference progress in the minutes and the conference image. This enables to later confirm to which scene captured on the conference the description corresponds. In addition, the present invention does not impose a burden on the conference participants.

A minutes-creating support program of the present invention is realized with a CPU (Central Processing Unit), ROM (Read Only Memory), RAM (Random Access Memory), and the like, by installing a program from a portable memory device or a storage device such as a hard disc device, CD-ROM, DVD, or a flexible disc or downloading the program through a communications line. Then, the steps of program are executed as the CPU operates the program.

The aforementioned program may include retaining portion retaining a conference image captured by a capturing apparatus to be associated with date and time information, associating information input from an inputting apparatus with the date and time information, and editing the information input from the inputting apparatus with retaining the date and time information. The memo editing portion 2 corresponds to an editing portion.

On the minutes-creating support apparatus in the above-mentioned aspect, the minutes-creating support apparatus may further include a replay portion replaying the conference image according to the information input from the inputting apparatus. The information that has been input from the inputting apparatus is linked with the conference image, it is therefore possible to view the conference image from the information that has been input from the inputting apparatus.

On the minutes-creating support apparatus in the above-mentioned aspect, the memo editing portion associates the information input from the inputting apparatus with the date and time information on a given piece of information basis. This makes it possible to edit on a given block basis, for example, every line.

Although a few embodiments of the present invention have been shown and described, it would be appreciated by those skilled in the art that changes may be made in these embodiments without departing from the principles and spirit of the invention, the scope of which is defined in the claims and their equivalents.

The entire disclosure of Japanese Patent Application No. 2005-090123 filed on Mar. 25, 2005 including specification, claims, drawings, and abstract is incorporated herein by reference in its entirety.

What is claimed is:

1. A minutes-creating support apparatus for creating minutes of a conference, the apparatus comprising:
   a conference image retaining portion having a computer-readable memory, which stores a conference image in the computer readable-memory, and which associates the stored conference image with date and time information, the date and time information being a date and a time at which the conference image is captured by a capturing apparatus;
   a memo editing portion which receives text information describing the conference input by a user from an inputting apparatus and input by employing a technique of voice automatic recognition based on the user's voice at a date and a time, associates the text information having the date and the time with corresponding date and time information of the conference image, and stores the associated information; and
   a minute creating portion which links the text information input from the inputting apparatus and input by employing the technique of voice automatic recognition with the conference image based on the associated date and time information stored by the memo editing portion to create the minutes, and which, if the user modifies the text information in the minutes, retains the date and time information associated with the text information based on the associated information stored by the memo editing portion, wherein the conference image is a conference moving image.

2. The minutes-creating support apparatus according to claim 1, further comprising a replay portion replaying the conference image according to the text information input from the inputting apparatus and input by employing the technique of voice automatic recognition.

3. The minutes-creating support apparatus according to claim 1, wherein the memo editing portion associates the text information input from the inputting apparatus and input by employing the technique of voice automatic recognition with the date and time information on a given piece of information basis.

4. The minutes-creating support apparatus according to claim 3, wherein the given piece of the text information includes at least one of a character, a word, a phrase, a sentence, and a line of text information input by the user.

5. The minutes-creating support apparatus according to claim 3, wherein the minute creating portion groups a plurality of pieces of text information.

6. The minutes-creating support apparatus according to claim 1, wherein the memo editing portion displays the text information input from the inputting apparatus and input by employing the technique of voice automatic recognition to correspond to the date and time information.

7. The minutes-creating support apparatus according to claim 1, wherein the minute creating portion provides editor on which the given piece of the text information input from the inputting apparatus and input by employing the technique of voice automatic recognition can be grouped.

8. The minutes-creating support apparatus according to claim 1, further comprising a minutes display portion generating first image data of a portion of minutes created by editing the text information by the minute creating portion and second image data of another portion of the minutes created independent of the text information, the first and second image data being displayed in different display fashions.

9. The minutes-creating support apparatus according to claim 1, wherein when the text information is grouped by the minute creating portion, the date and time information associated with the text information is grouped along with the text information.

10. The minutes-creating support apparatus according to claim 1, wherein the text information input by the user is input during the conference.

11. The minutes-creating support apparatus according to claim 1, wherein the minute creating portion creates the minutes, the minutes including the text information input from the inputting apparatus and input by employing the technique of voice automatic recognition and the associated corresponding date and time information.

12. The minutes-creating support apparatus according to claim 1, wherein if the user modifies the text information by editing the text information, the minute creating portion retains the date and time information associated with the edited text information.

13. The minutes-creating support apparatus according to claim 1, wherein if the user modifies the text information by grouping the text information to a different position in the minutes, the minute creating portion retains the date and time information associated with the grouped text information.

14. The minutes-creating support apparatus according to claim 1, wherein the minute creating portion automatically links the text information input from the inputting apparatus and input by employing the technique of voice automatic recognition when the text information is input with the conference image based on the associated date and time information stored by the memo editing portion to create the minutes.

15. A minutes-creating support method for creating minutes of a conference, the method comprising:

storing a conference image captured by a capturing apparatus and associating the stored conference image with date and time information, the date and time information being a date and a time at which the conference image is captured by the capturing apparatus;

associating text information describing the conference input by a user from an inputting apparatus and input by employing a technique of voice automatic recognition based on the user's voice at a date and a time with corresponding date and time information of the conference image and storing the associated information; and linking the text information input from the inputting apparatus and input by employing the technique of voice automatic recognition with the stored conference image based on the stored associated date and time information to create the minutes, and if the user modifies the text information in the minutes, retaining the date and time information associated with the text information based on the stored associated information, wherein the conference image is a conference moving image.

16. The minutes-creating support method according to claim 15, further comprising replaying the conference image according to the text information input from the inputting apparatus and input by employing the technique of voice automatic recognition.

17. The minutes-creating support method according to claim 15, further comprising displaying the text information input from the inputting apparatus and input by employing the technique of voice automatic recognition to correspond to the date and time information.

18. The minutes-creating support method according to claim 15, further comprising displaying an editor on which the given piece of the text information input from the inputting apparatus and input by employing the technique of voice automatic recognition can be grouped.

19. The minutes-creating support method according to claim 15, further comprising generating first image data of a portion of minutes created by editing the text information and generating second image data of another portion of the minutes created independent of the text information, the first and second image data being displayed in different display fashions.

20. The minutes-creating support method according to claim 15, wherein when the text information is grouped, the date and time information associated with the text information is grouped along with the text information.

21. The minutes-creating support method according to claim 15, further comprising creating the minutes, the minutes including the text information input from the inputting apparatus and input by employing the technique of voice automatic recognition and the associated date and time information.

22. A storage medium readable by a computer, the storage medium storing a program of instructions executable by the computer to perform a function for supporting creating the minutes of a conference, the function comprising:

storing a conference image captured by a capturing apparatus and associating the stored conference image with date and time information, the date and time information being a date and a time at which the conference image is captured by the capturing apparatus;

associating text information describing the conference input by a user from an inputting apparatus and input by employing a technique of voice automatic recognition based on the user's voice at a date and a time with corresponding date and time information of the conference image and storing the associated information; and linking the text information input from the inputting apparatus and input by employing the technique of voice automatic recognition with the stored conference image based on the stored associated date and time information to create the minutes, and if the user modifies the text information in the minutes, retaining the date and time information associated with the text information based on the stored associated information, wherein the conference image is a conference moving image.

23. The storage medium according to claim 22, wherein the function for supporting creating the minutes further comprises generating first image data of a portion of minutes created by editing the text information and generating second image data of another portion of the minutes created independent of the text information, the first and second image data being displayed in different display fashions.

24. The storage medium according to claim 22, wherein when the text information is grouped, the date and time information associated with the text information is grouped along with the text information.

25. The storage medium according to claim 22, wherein the function further comprises creating the minutes, the minutes including the text information input from the inputting apparatus and input by employing the technique of voice automatic recognition and the associated date and time information.

* * * * *